United States Patent
Lin et al.

(10) Patent No.: US 10,104,618 B2
(45) Date of Patent: *Oct. 16, 2018

(54) SAVING POWER IN A MOBILE TERMINAL

(71) Applicant: Nvidia Corporation, Santa Clara, CA (US)

(72) Inventors: Li Lin, Shenzhen (CN); Jiukai Ma, Shenzhen (CN); Haonong Yu, Shenzhen (CN); Jun Qiu, Shenzhen (CN); Liangchuan Mi, Santa Clara, CA (US); Shail Dave, Santa Clara, CA (US); Zhichao Zu, Santa Clara, CA (US); Karthik Samynathan, Santa Clara, CA (US); Richard Clark, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,963

(22) Filed: Oct. 18, 2016

(65) Prior Publication Data

US 2017/0135043 A1    May 11, 2017

Related U.S. Application Data

(63) Continuation of application No. 14/094,494, filed on Dec. 2, 2013, now Pat. No. 9,474,022.

(30) Foreign Application Priority Data

Nov. 30, 2012  (CN) .......................... 2012 1 0507375

(51) Int. Cl.
H04W 52/02    (2009.01)

(52) U.S. Cl.
CPC ... *H04W 52/0235* (2013.01); *H04W 52/0209* (2013.01)

(58) Field of Classification Search
CPC .................... H04W 52/0235; H04W 52/0209
See application file for complete search history.

(56) References Cited

U.S. PATENT DOCUMENTS

| 7,100,062 | B2 | 8/2006 | Nicholas |
| 8,188,851 | B2 * | 5/2012 | Haartsen ............... G06F 1/3215 340/531 |
| 8,526,604 | B2 * | 9/2013 | Batra ................ H04W 52/0225 380/31 |
| 2010/0067421 | A1 | 3/2010 | Gorokhov et al. |
| 2010/0099358 | A1 | 4/2010 | Kumar et al. |
| 2012/0167118 | A1 | 6/2012 | Pingili et al. |

FOREIGN PATENT DOCUMENTS

| CN | CN1681342 | 10/2005 |
| CN | CN101916137 | 12/2010 |
| CN | CN101990283 | 3/2011 |
| DE | 102013109644 | 3/2014 |

* cited by examiner

*Primary Examiner* — Tuan H Nguyen (57) ABSTRACT

Saving power in a mobile terminal includes determining alignment processing moments after the mobile terminal enters a standby mode. Alignable wakeup events, which occur during alignment processing periods corresponding to each alignment processing moment, are thus controlled to commence related processing at each of the alignment processing moments. Power consumption caused by various wakeup events in a standby mode may thus be reduced and battery life of the mobile terminal may thus be improved.

20 Claims, 5 Drawing Sheets

SAVING POWER IN A MOBILE TERMINAL

REFERENCE TO RELATED APPLICATION

This application is a continuation application of the U.S. patent application Ser. No. 14/094,494, entitled "SAVING POWER IN A MOBILE TERMINAL," filed on Dec. 2, 2013, which claims priority to Chinese Patent Application No. 201210507375.8, filed in the State Intellectual Property Office of the Peoples' Republic of China on Nov. 30, 2012. The contents of the foregoing patent applications are incorporated herein by reference in their entireties for all purposes.

TECHNOLOGY

Embodiments of the present invention relate generally to power management in a mobile terminal. More particularly, an example embodiment of the present invention relates to a method for saving power in a mobile terminal.

BACKGROUND OF THE INVENTION

Currently, battery life limitations pose a significant challenge for mobile terminals, such as "smart phones." Users of mobile smart phone users may be disappointed that the power charge in their phones' batteries may be depleted after periods as short as less than a day. Some studies indicate that standby time uses a significant portion of daily phone battery usage. A phone in its standby mode "wakes up" (e.g., activates, or assumes an active state after reposing in an otherwise relatively inactive, dormant or "sleeping" state) quite frequently in response to wakeup events that occur from various applications, such as "Gmail™," "Pulse™," "Facebook™" and the like. Typically, the more communications related applications are installed on a phone, the more wakeup events occur and thus, the more frequently the phone wakes up. Although a phone's display screen is off during standby time, the overall power consumption of the phone in standby mode may still be significantly increased by its frequent wakeup. An unawakened phone in standby mode may generally consume about 10 Milliwatts (mW) of power. However, power consumption may rise by an order of magnitude or more to reach 170 mW of a phone that is awakened in the standby mode.

A conventional approach to reducing power consumption in a mobile device is directed to turning off (e.g., deactivating) as many power expensive applications as possible. Further, applications such as "Easy Power Saver," "Juice Saver" and the like exist, which are designed to conserve power of a mobile terminal's daily usage. Such power saving applications typically enable and disable a phone's communication or interconnectivity features such as Wireless Fidelity (WIFI) wireless local area network (wLAN) or Third or Fourth Generation, etc. (3G or 4G, etc.) and/or adjust its backlight brightness level by changing some of the phone's control components based on pre-defined rules and time. However, disabling WIFI or 3G, etc. may affect user experience with the mobile terminal adversely.

Therefore, a method for saving power in a mobile terminal would be useful, which does not affect adversely a user's experience therewith.

SUMMARY OF THE INVENTION

An embodiment of the present invention relates to saving power in a mobile terminal In an example embodiment of the invention described herein, a method for saving power in a mobile terminal comprises determining alignment processing moments after the mobile terminal enters a standby mode, and controlling alignable wakeup events which occur during alignment processing periods corresponding to each alignment processing moment so as to commence processing associated with each of the alignable wakeup events at each of the determined alignment processing moments.

In an example embodiment of the present invention, the method further comprises determining an unalignable wakeup event to be added to a white list, wherein the unalignable wakeup event is processed immediately when it occurs. As used herein, the term 'unalignable' relates to a characteristic associated with an inability to align, e.g., an inability of a first wakeup event to align temporally (e.g., in time) with a second wakeup event.

In an example embodiment of the present invention, the determining alignment processing moments comprises determining a time interval between adjacent alignment processing moments, starting to time the time interval as soon as the mobile terminal enters the standby mode, and determining the alignment processing moments based on the time interval.

In an example embodiment of the present invention, the alignable wakeup events comprise alarm wakeup events.

In an example embodiment of the present invention, the alignable wakeup events comprise alarm wakeup events.

In an example embodiment of the present invention, the alignable wakeup events comprise 'Wake on Wan' events.

In an example embodiment of the present invention, the method further comprises determining an occurrence frequency of the Wake on Wan events; wherein the controlling the alignable wakeup events, which occur during alignment processing periods corresponding to each alignment processing moment, is performed when the occurrence frequency exceeds (e.g., is higher than) a preset value.

In an example embodiment of the present invention, the alignable wakeup events comprise alarm wakeup events and Wake on Wan events, and the alignment processing moments of the alarm wakeup events and the alignment processing moments of the Wake on Wan events each have respective time intervals, which may be independent of each other.

In an example embodiment of the present invention, at least some of the alignment processing moments of the alarm wakeup events comprise the same alignment processing moments as alignment processing moments corresponding to the Wake on Wan events. An example embodiment may be implemented wherein the alignment processing moments of the alarm wakeup events comprise the same alignment processing moments as (e.g., are coincidental with) the alignment processing moments of the Wake on Wan events.

In an example embodiment of the present invention, the method further comprises determining an occurrence frequency of the Wake on Wan events, wherein, when the occurrence frequency is lower than a preset value, the alignment processing moments of the Wake on Wan events comprise the same alignment processing moments as the alignment processing moments of the alarm wakeup events.

In an example embodiment of the present invention, the time interval is set by a user.

An example embodiment may be implemented wherein the time interval comprises two-to-four (2-4) minutes.

In an example embodiment of the present invention, the determining alignment processing moments comprises counting the number of the alignable wakeup events which occur after the mobile terminal enters the standby mode, and determining the alignment processing moments based on the number of the alignable wakeup events.

In an example embodiment of the present invention, the determining the alignment processing moments based on the number of the alignable wakeup events comprises determining at least one alignment processing moment whenever the number of the alignable wakeup events reaches an integral multiple of a set value, during a time period that commences upon an entrance of the mobile terminal into the standby mode.

In an example embodiment of the present invention, the set value is established based on a user input.

In an example embodiment of the present invention, the set value comprises at least one of a fixed value, or a value that is adjustable based on an occurrence frequency of the alignable wakeup events.

In an example embodiment of the present invention, the alignable wakeup events comprise alarm wakeup events.

In an example embodiment of the present invention, the alignable wakeup events comprise Wake on Wan events.

In an example embodiment of the present invention, the alignable wakeup events comprise alarm wakeup events and Wake on Wan events, and the number of the alarm wakeup events and the number of the Wake on Wan events are counted together to determine common alignment processing moments.

In an example embodiment of the present invention, the alignable wakeup events comprise alarm wakeup events and Wake on Wan events, and (the number of the alarm wakeup events and the number of the Wake on Wan events are counted separately to determine their respective alignment processing moments.

The method for saving power in a mobile terminal according to an example embodiment of the present invention can reduce power consumption, which may be caused by various wakeup events in a standby mode, and thus improve battery life or useful power charge duration of the mobile terminal.

Additional features of example embodiments of the present invention are set forth in the description of example embodiments thereof that follows below, and in part may be apparent from the description, or may be learned by practice of the invention. Abilities of embodiments of the invention will be realized, which may be attained by the method particularly pointed out in the description of example embodiments and claims hereof as well as the appended drawings.

It is to be understood that both the foregoing general description and the following somewhat more detailed description are provided by way of example and explanation (and not in any way by limitation) and are intended to provide further explanation of example embodiments of the invention, as claimed.

BRIEF DESCRIPTION OF THE DRAWINGS

The following accompanying drawings comprise a part of the description herein of example embodiments of the present invention and are used for explaining features, elements and attributes of example embodiments of the present invention and example implementations thereof. The descriptions are illustrated in these drawing figures (FIG.) to explain principles of example embodiments of the present invention. The figures are not drawn to any particular scale. In the drawings.

DESCRIPTION OF EXAMPLE EMBODIMENTS

Example embodiments of the present invention are described herein in the context of and in relation to methods for saving power in a mobile terminal. Reference will now be made in detail to implementations of the example embodiments as illustrated in the accompanying drawings. The same reference numbers will be used to the extent possible throughout the drawings and the following description to refer to the same or like items. It will be apparent to artisans of ordinary skill in technologies that relate to mobile terminals, that the present invention may be practiced without some of these specifically described details. For focus, clarity and brevity, as well as to avoid unnecessarily occluding, obscuring, obstructing or obfuscating features that may be somewhat more germane to, or significant in explaining example embodiments of the present invention, this description may avoid describing some well-known processes, structures, components and devices in exhaustive detail. Ordinarily skilled artisans in these technologies should realize that the following description is made for purposes of explanation and illustration and is not intended to be limiting in any way. Other embodiments should readily suggest themselves to artisans of such skill in relation to the features and corresponding benefit of this disclosure.

Figure 1:
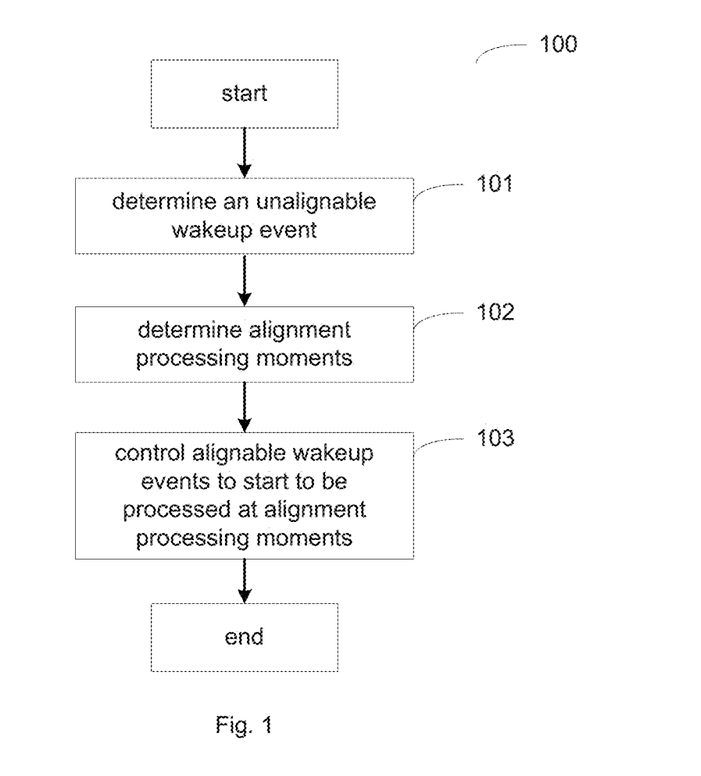
FIG. 1 depicts a flow chart for an example method for saving power in a mobile terminal, according to an example embodiment of the present invention.

An example embodiment of the present invention is described in relation to a method for saving power in a mobile terminal. FIG. 1 depicts a flow chart of an example method 100 for saving power in a mobile terminal, according to an example embodiment of the present invention. Method 100 comprises a step 102 for determining alignment processing moments and a step 103 for controlling alignable wakeup events such that processing commences in relation to applications associated with the alignable wakeup events at the alignment processing moments. As used herein, the term 'alignable' may relate to a characteristic of a group of processing moments that allows the processing moments of the group to be aligned. The alignment processing moments are determined in step 102 after the mobile terminal enters a standby mode. At step 103, alignable wakeup events, which occur during alignment processing periods that correspond to each alignment processing moment, are controlled to commence being processed at each of the alignment processing moments.

Figure 2:
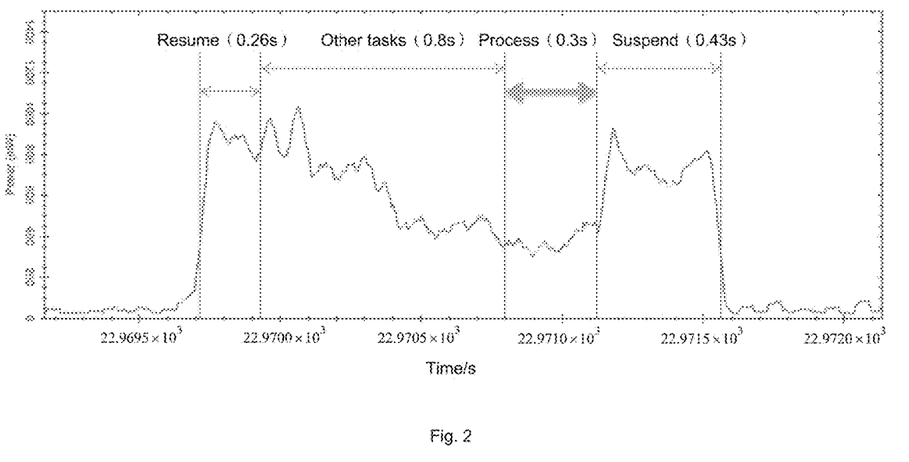
FIG. 2 graphs an example time-power diagram of wakeup event processing.

After a mobile terminal enters a standby mode, it may be awakened (e.g., waken up) frequently by various wakeup events. For example, some mobile terminals are awakened every 15 seconds by instant chat software such as 'QQ for Pad' (an example social networking application) that is installed thereon. Frequent wakeup and wakeup event processing may significantly, even greatly (e.g., substantially)

increase overall power consumption of a mobile terminal. FIG. 2 graphs a time-power diagram 200 of wakeup event processing. As graphed in FIG. 2, operations for a wakeup event may comprise resuming, processing, suspending and/or other tasks. The time for processing the wakeup event endures for a period of 0.3 seconds, which is significantly briefer than the duration of the other operations. Further, the power consumed for processing the wakeup event is less than that consumed by other operations; processing power use approximating 15% of power consumed over the overall procedure. Therefore, aligning multiple wakeup events can make the resuming tasks, the suspending tasks and the other tasks to be performed commence at a single moment or point in time, which may significantly reduce the overall power consumption of a mobile terminal.

At step 102, alignment processing moments are determined to make the processing of the wakeup events, which occur one by one during alignment processing periods corresponding to each alignment processing moment, commence in temporal alignment at each of the alignment processing moments. In contrast to conventional approaches, which process a wakeup event (e.g., each or any such wakeup event) as soon as it occurs (e.g., upon its occurrence), an example embodiment of the present invention rather processes multiple wakeup events in temporal alignment, which can reduce the overall power consumption of a mobile terminal.

At step 103, alignable wakeup events, which occur during alignment processing periods corresponding to each alignment processing moment, are controlled such that processing related to each of the alignable wakeup events commences at each of the alignment processing moments. The control procedure can be implemented by one or more controlling module(s) or unit(s) in the mobile terminal. For example, an example embodiment may be implemented wherein control procedure 100 relates to controlling the triggering time of a real time clock (RTC) of a center processing unit (CPU), which may execute instructions stored on a non-transitory computer processor-readable storage medium such as memory) in the mobile terminal. The first alignment processing period spans the time period that commences with the moment at which the mobile terminal enters the standby mode to the first alignment processing moment. Thus, the alignable wakeup events, which occur during the first alignment processing period, start to be processed (e.g., commence processing related thereto) at the first alignment processing moment. Not dissimilarly, the second alignment processing period extends in time from the first alignment processing moment to a second alignment processing moment, and so on through time. While an alignment processing period may endure for several minutes (min.), the time for processing alignable wakeup events may be comparatively brief in relation thereto, typically enduring for several hundred milliseconds (ms) or so; a distinction of an order of magnitude or more. Aligning wakeup events according to example embodiments of the present invention can thus decrease significantly the overall power consumption, or a rate thereof, by a mobile terminal.

A method performed in accordance with an example embodiment such as described in relation to FIG. 1 can reduce power consumption, or a rate thereof, which may be caused by various wakeup events in a standby mode and extend battery life of a mobile terminal without affecting user experience. Thus optimizing power consumption of a mobile terminal extends its effective usage time and/or allows a reduction in battery size and weight, which allows reduction in a form factor of mobile terminals, which may thus be assembled thinner, lighter and otherwise user preferable.

In an example embodiment of the present invention, method 100 may also comprise a step 101, which relates to determining an unalignable wakeup event. At step 101, an unalignable wakeup event that is determined to exist is added to a white list. An example embodiment allows the unalignable wakeup event to be processed without delay or latency; e.g., immediately, or as (e.g., when) it occurs. While aligning multiple wakeup events can help to reduce the mobile terminal's overall power consumption or a rate related thereto, the aligning may add some latency to at least some of these wakeup events. Commencement of processing of such wakeup events may thus be delayed in relation to other processing. To achieve their tasks however, immediate or substantially zero latency on call processing may be significant in relation to one or more wakeup events. For example, a wakeup event on a mobile terminal platform that deploys or incorporates an Android™ based or not dissimilar system alarm application is used to alert the user by ringing, otherwise emitting an audible alerting stimulus of some kind, or vibrating or generating some other kind of alerting stimulus at a particular programmed or triggered moment in time. If its processing is delayed, e.g., so as to be processed in alignment with other wakeup events, its intended value may be reduced, diminished, extinguished or lost. Not dissimilarly, wakeup events of other applications may be added to the white list as unalignable wakeup events as required or according to a user input. Thus, determining some unalignable wakeup events allows an example embodiment to reduce power consumption without affecting user experience. It should be understood by those of ordinary skill in the related technology arts that the unalignable wakeup events can be determined according to correlated inputs by a user.

Figure 3:
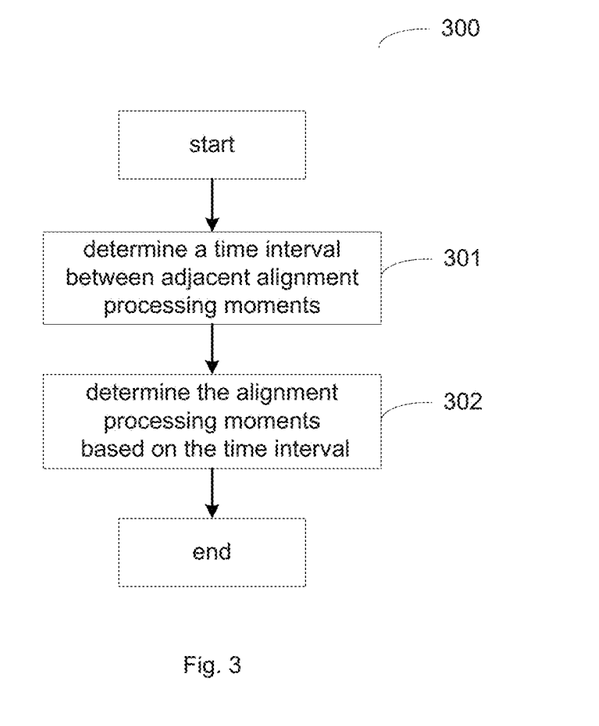
FIG. 3 depicts a flow chart for an example method for determining alignment processing moments, according to an example embodiment of the present invention.

FIG. 3 depicts a flow chart of an example method 300 for determining alignment processing moments, according to an example embodiment of the present invention.

At step 301, a time interval between adjacent alignment processing moments is determined. Here, the time interval represents the alignment processing period described in the step 102 shown in FIG. 1. Then at step 302, when a mobile terminal enters a standby mode, in which it starts to time the time interval and determines the alignment processing moments based on the time interval. It is simple and reliable to determine the alignment processing moments based on the determined time interval.

According to an example embodiment of the present invention, the time interval may be set or selected by a user. A user can set the time interval as may achieve a good trade-off between reducing power consumption and effectively serving applications.

According to an example embodiment of the present invention, the alignable wakeup events may comprise alarm wakeup events. The alarm wakeup events are generated when some applications installed on a mobile terminal use alarms to regularly poll servers or execute other repetitive tasks.

When the alignable wakeup events comprise only alarm wakeup events, a time interval between adjacent alignment processing moments of the alarm wakeup events may be determined. The alignment processing moments of the alarm wakeup events can thus be determined based on the time interval, which is determined between the adjacent alignment processing moments of the alarm wakeup events. The alarm wakeup events which occur during alignment processing periods corresponding to each alignment processing moment may start to be processed at the next alignment processing moment. For example, the processing for at least some of the alarm wakeup events is delayed by controlling the triggering time of the RTC of the CPU in the mobile terminal.

According to an example embodiment of the present invention, the alignable wakeup events may comprise Wake on Wan events. The Wake on Wan events occur when some applications push messages from a server via a network. The mobile system wakes up upon receipt of the network message packets pushed from the server over the network.

The alignable wakeup events may comprise only Wake on Wan events. According to an example embodiment of the present invention, an occurrence frequency of the Wake on Wan events may thus be determined first. The controlling of the alignable wakeup events, which occur during alignment processing periods corresponding to each alignment processing moment, starts to be processed at each alignment processing moment, may be performed upon the occurrence frequency exceeding a preset value (e.g., occurrence frequency threshold). Thus, upon the occurrence frequency of the Wake on Wan events reaching a value that is higher than the preset value, an example embodiment commences processing the controlling step. When the occurrence frequency of the Wake on Wan events is lower, e.g., when the time interval between two adjacent Wake on Wan events is longer than the threshold, the Wake on Wan events may be processed immediately upon their occurrence instead of being processed in alignment. The preset value may be set based on the mobile terminal itself or be set or modified by a user setting based on the user's preference. An example embodiment may be implemented optionally, in which the preset value comprises a threshold occurrence frequency of one occurrence in a three minute period, e.g., one occurrence per three minutes (⅓ min.). Upon the Wake on Wan events occurring more than one time in the three minute period, an example embodiment would thus be operable to align the Wake on Wan events.

The alignment processing for the Wake on Wan events may be implemented by the following steps. The messages sent from a server to the 3G module or the WIFI module, etc. are first buffered in the mobile terminal, which triggers the Wake on Wan events. Upon triggering the Wake on Wan events, the triggering time of the RTC of the mobile terminal CPU is set based on the alignment processing moments. Processing the buffered messages commences after the CPU is triggered. It should be understood by those ordinary skill in the arts relating to mobile, telephone and communication technology that, even if the processing moments of the Wake on Wan events are much later than the moments that the message arrive at the mobile terminal, the messages may be pushed from the server again based on the network.

According to an example embodiment of the present invention, the alignable wakeup events may comprise alarm wakeup events and Wake on Wan events, and the alignment processing moments of the alarm wakeup events and the alignment processing moments of the Wake on Wan events have their respective time intervals.

According to an example embodiment of the present invention, at least some of the alignment processing moments of the alarm wakeup events comprise the same moments in time as corresponding alignment processing moments of the Wake on Wan events (e.g., the alarm wakeup event alignment processing moments coincide with those of the Wake on Wan events), in which the time interval of the alignment processing moments of the alarm wakeup events is in proportion to the alignment processing moments of the Wake on Wan events. For example, the time interval of the alignment processing moments of the alarm wakeup events may comprise a period of five (5) minutes and the time interval of the alignment processing moments of the Wake on Wan events may comprise a time period of 10 minutes. Thus, the time interval of the alignment processing moments of these Wake on Wan events comprises twice the time interval of the alarm wakeup events. In this case, half of the alignment processing moments of the alarm wakeup events comprise the same moments in time as the corresponding alignment processing moments of the Wake on Wan events. Thus, processing a part of the alarm wakeup events and the Wake on Wan events in alignment with each other reduces the overall power consumption of the processing operations.

The alignment processing moments of the alarm wakeup events may all comprise the same moments in time as the alignment processing moments of the Wake on Wan events, which is beneficial. In this situation, the alarm wakeup events and the Wake on Wan events that occur during an alignment processing period may all be processed in alignment at the alignment processing moment, which can awaken the mobile terminal with a least frequently and may thus conserve power most efficiently.

According to an example embodiment of the present invention, when the alignable wakeup events comprise alarm wakeup events and Wake on Wan events, an occurrence frequency of m the Wake on Wan events may first be determined. When it is thus determined that the occurrence frequency has a value lower than a preset value (e.g., a low occurrence frequency threshold), the alignment processing moments of the Wake on Wan events all comprise the same moment in time as the alignment processing moments of the alarm wakeup events. For example, when the Wake on Wan events occur infrequently, the time interval of the alignment processing moments of the Wake on Wan events may be set to be the same as the time interval of the alarm wakeup events, such that the Wake on Wan events are processed along with the corresponding alarm wakeup events. When the Wake on Wan events occur more frequently however, the time interval between the Wake on Wan events alignment processing moments may be set separately (e.g., independently) from the time interval between the alarm wakeup event alignment processing moments. In this situation, the Wake on Wan events may be processed at their own respective alignment processing moments. An example embodiment of the present invention may thus be implemented to provide flexibility to mobile terminals, which allows them to more efficiently save power by changing their event processing based on the occurrence frequency of the Wake on Wan events.

Table 1 and Table 2 below show power consumption data of an example mobile terminal. The contrast in the data between Table 1 and Table 2 relate to a typical power consumption profile of the device using conventional approaches and an improved power consumption profile that is associated with an implementation of an example embodiment of the present invention.

In both Table 1 and Table 2, the example data associated with the conventional approaches is tabulated across the rows corresponding to the 'No login' and 'No alignment' configurations. In both Table 1 and Table 2, the example data associated with an implementation of an example embodiment of the present invention are tabulated across the rows corresponding to the enumerated time intervals, which are labeled in minutes (min). The example mobile terminal to which these data apply comprises an Android™ telephone platform. Table 1 shows the power consumption contrast of the wakeup events before and after they are processed in alignment when 15 example applications installed on an Android™ phone use WIFI. Table 2 shows the power consumption contrast of the wakeup events before and after they are processed in alignment when the 15 example applications installed on an android phone use 3G networking. The 15 example applications comprise: Twitter™, Facebook™, Dolphin Browser HD™, Gmail™, Yahoo Mail™, Google Gtalk™, Pulse™, KakaoTalk Free Calls & Text™, Evernote™, Sina Weibo™, Weixin™, Kaixin001™, Taobao™, Renren™ and Mi Talk™. Table 1 and Table 2 both present experimental data collected over a 30 minute test of the example mobile platform. The time intervals of the example alignment processing moments comprise: one (1) minute, three (3) minutes, five (5) minutes and 10 minutes, as enumerated respectively in the 'configuration' column of Table 1 and Table 2, below.

TABLE 1

Testing with WIFI

| Configuration | Times of Wake on Wan events | Times of alarm wakeup events | Total times of wakeup events | Total power (mW) | Power of WIFI module (mW) | Power of applications (mW) |
|---|---|---|---|---|---|---|
| No Login | 7 | 6 | 13 | 60.15 | 25.03 | 35.12 |
| No Alignment | 180 | 51 | 231 | 203.82 | 71.93 | 131.89 |
| 1 min | 16 | 25 | 41 | 129.98 | 65.03 | 64.95 |
| 3 min | 8 | 9 | 17 | 83.36 | 34.13 | 49.23 |
| 5 min | 5 | 6 | 11 | 71.60 | 36.40 | 25.20 |
| 10 min | 5 | 3 | 8 | 86.03 | 43.75 | 42.28 |

TABLE 2

Testing with 3G

| Configuration | Times of Wake on Wan events | Times of alarm wakeup events | Total times of wakeup events | Total power (mW) | Power of WIFI module (mW) | Power of applications (mW) |
|---|---|---|---|---|---|---|
| No Login | 14 | 18 | 32 | 134.77 | 84.15 | 50.62 |
| No Alignment | 130 | 29 | 159 | 764.15 | 571.63 | 192.52 |
| 1 min | 29 | 28 | 57 | 747.29 | 625.08 | 122.21 |
| 3 min | 7 | 9 | 16 | 522.71 | 460.51 | 62.20 |
| 5 min | 15 | 14 | 29 | 261.93 | 211.06 | 50.87 |
| 10 min | 2 | 2 | 4 | 474.79 | 407.38 | 47.41 |

The "No login" designator in the 'Configuration' columns of Table 1 and Table 2 relates to a first situation in which the 15 example applications are not started. For example, the application QQ is installed on the mobile terminal, but a user does not login (or otherwise activate) to use the installed application QQ. In this first situation, the power consumption of the example mobile terminal can be expected to be relatively low. The "No alignment" designator in the configuration columns of Table 1 and Table 2 relates to a second situation. The second situation may represent a typical conventional use of the example mobile terminal, in which the user does not activate and use an implementation of an example embodiment of the present invention for saving power. The rows corresponding to the time intervals enumerated "1 min," 3 min," "5 min" and "10 min" each present test data collected over each of these respective time periods, in which the example mobile terminal was operable for aligning processing moments according to an example embodiment of the present invention. As seen with the data presented in Table 1 and Table 2, the example mobile terminal consumes more power when it uses the conventional "No alignment" configuration than when the mobile terminal is operable for aligning processing moments according to an example embodiment of the present invention. As the data presented in Table 1 and Table 2 show, the aligning of the processing wakeup events according to an example embodiment of the present invention reduces power whether either WIFI or 3G is used for connecting the example mobile device. The data presented in Table 1 and Table 2 also show that it is not necessarily correct to assume that less overall power is consumed with longer time intervals between sequentially adjacent alignment processing moments is. For example, when the time interval between the adjacent alignment processing moments comprises a period of 10 minutes, the overall power consumption of the example mobile terminal exceeds the overall power consumption of the mobile terminal when the time interval between the adjacent alignment processing moments comprises a period of five (5) minutes. This result follows, because the number of alignable wakeup events that occurs during the longer 10 min. interval is relatively high, such that power consumption rises commensurately if these alignable wakeup events are processed in alignment at the more widely spaced alignment processing moments. An example embodiment may be implemented in which a time interval between adjacent alignment processing events of between two and four minutes (2-4 min) results in the most efficient levels of power consumption. For example, the data presented in Table 1 and Table 2 show that power consumption is minimized when the time interval between the processing moments comprises a period of about three (3) minutes.

Figure 4:
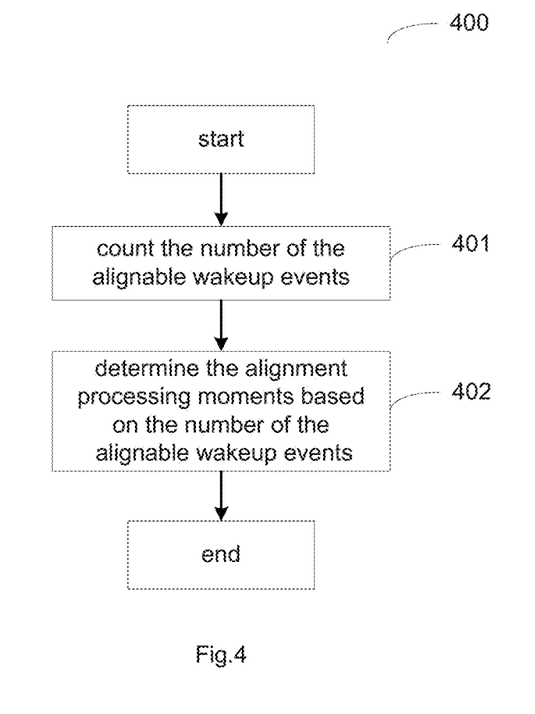
FIG. 4 depicts a flow chart for an example method for determining alignment processing moments, according to an example embodiment of the present invention.

FIG. 4 depicts a flow chart of an example method 400 for determining alignment processing moments according to an example embodiment of the present invention.

At step 401, the number of the alignable wakeup events which occur after the mobile terminal enters the standby mode is counted. At step 402, the alignment processing moments are determined based on the number of the alignable wakeup events.

According to an example embodiment of the present invention, the determining the alignment processing moments based on the number of the alignable wakeup events may comprise determining one alignment processing moment whenever the number of the alignable wakeup events reaches an integral multiple of a set (e.g., preset) value since the mobile terminal enters the standby mode. For example, if the set value comprises '10,' the first alignment processing moment is determined when the number of the alignable wakeup events which have occurred since the mobile terminal enters the standby mode reaches 10. The number of the alignable wakeup events may be accumulated continuously. The second alignment processing moment is determined when the number of the alignable wakeup events reaches 20, and so on. Determining alignment processing moments based on the number of the alignable wakeup events could save power effectively.

According to an example embodiment of the present invention, the set value is set or adjustable by a user.

Optionally, the set value may be a predefined fixed value or can be adjusted based on an occurrence frequency of the alignable wakeup events. Power saving preferences may be balanced with the power use needs of the applications on the mobile terminal. Balancing power savings and application power needs can be achieved by adjusting the set value based on the occurrence frequency of the alignable wakeup events.

According to an example embodiment of the present invention, the alignable wakeup events may comprise alarm wakeup events. When all of the alignable wakeup events comprise alarm wakeup events, the number of the alarm wakeup events which occur after the mobile terminal enters the standby mode may be counted. The alignment processing moments can be determined based on the number of the alarm wakeup events, and the alarm wakeup events which occur during alignment processing periods corresponding to each alignment processing moment may start to be processed at each of the alignment processing moments.

According to an example embodiment of the present invention, the alignable wakeup events may comprise Wake on Wan events. When the alignable wakeup events all comprise Wake on Wan events, the number of the Wake on Wan events which occur after the mobile terminal enters the standby mode may be counted. The alignment processing moments can be determined based on the number of the Wake on Wan events. The Wake on Wan events which occur during alignment processing periods commencing at each alignment processing moment may start to be processed at each of the alignment processing moments.

According to an example embodiment of the present invention, the alignable wakeup events may comprise alarm wakeup events and Wake on Wan events. The number of the alarm wakeup events and the number of the Wake on Wan events are counted together to determine common alignment processing moments. When the alignable wakeup events comprise alarm wakeup events and Wake on Wan events, all of the alignable wakeup events of each type, which occur after the mobile terminal enters the standby mode, may be counted. Thus, all of the alignable wakeup events occurring after the mobile terminal enters standby mode are counter, whether the alignable wakeup events individually comprise alarm wakeup events or Wake on Wan events; the total number of the alignable wakeup events which occur after the mobile terminal enters the standby mode, e.g., both alarm wakeup events and Wake on Wan events among them, are counted. One alignment processing moment can be determined whenever the number of the alignable wakeup events reaches an integral multiple of a set (e.g., preset) value. Thus, an example embodiment may be implemented in which a level of power saving can be maximized by processing the alarm wakeup events and the Wake on Wan events in alignment with each other.

According to an example embodiment of the present invention, the alignable wakeup events may comprise alarm wakeup events and Wake on Wan events, and the number of the alarm wakeup events and the number of the Wake on Wan events are counted separately to determine their respective alignment processing moments. When the alignable wakeup events comprise alarm wakeup events and Wake on Wan events, power may be saved by processing the alarm wakeup events and the Wake on Wan events at their respective alignment processing moments and the processing economy and/or efficiency of each may be simplified and/or streamlined by processing the same type of events at the respective alignment moments.

Figure 5A:
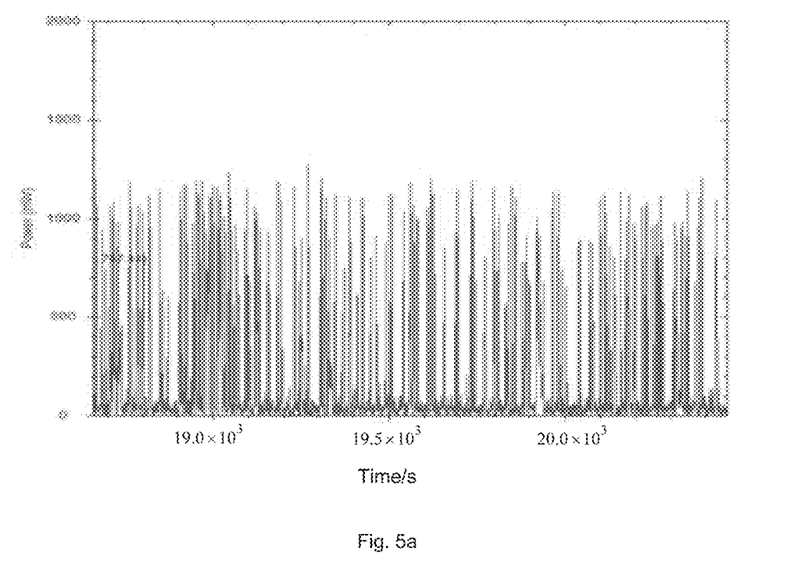
FIG. 5A depicts typical mobile terminal overall power consumption using a conventional approach and FIG. 5B depicts an example mobile terminal overall power consumption, according to an embodiment of the present invention.
Figure 5B:
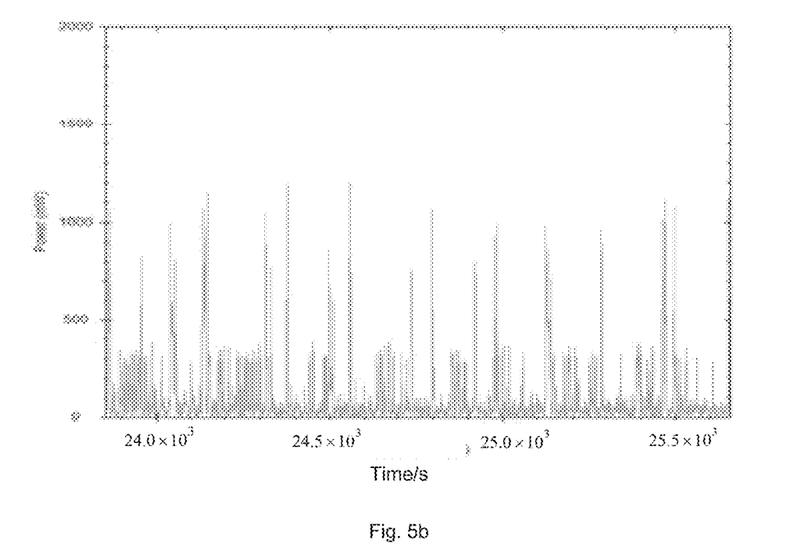

FIG. 5A depicts a diagram of overall power consumption of a typical conventional mobile terminal. FIG. 5B depicts a diagram of overall power consumption of the mobile terminal using a method for saving power, according to an example embodiment of the present invention. In FIG. 5A and FIG. 5B, the abscissas of any dot in the curves represents testing time (in which the units comprise seconds) and the ordinate of any dot in the curves represents the overall power consumption of the mobile terminal at corresponding testing time (in which the units comprise Milliwatts—'mW'). Contrasting the power consumption of the conventional mobile platform shown in FIG. 5A with the power consumption of the mobile terminal implementing an example embodiment of the present invention shown in FIG. 5B illustrates significant reductions in power consumption of the mobile terminal, using the method for saving power according to an example embodiment of the present invention.

It should be appreciated that various modifications, adaptations, equivalents and alternatives thereof may be made within the scope and spirit of embodiments of the present invention, as described above in relation to an example embodiment thereof. An embodiment of the present invention is further defined, as recited in the following claims.

What is claimed is:

1. A method of saving power in a mobile device, the method comprising:
   determining an alignment processing moment for a set of alignable wakeup events; and
   controlling processing of the set of alignable wakeup events to commence at the alignment processing moment, wherein the set of alignable wakeup events occur in different times and occur prior to the alignment processing moment.

2. The method as recited in claim 1, wherein the set of alignable wakeup events occur during an alignment processing time period that is defined between the mobile device entering into a standby mode and the alignment processing moment.

3. The method as recited in claim 1, wherein the set of alignable wakeup events occur during an alignment processing time period that is defined between a preceding alignment processing moment and the alignment processing moment.

4. The method as recited in claim 1, wherein the controlling comprises controlling a trigger time of a real time clock (RTC) of a central processing unit (CPU) of the mobile device.

5. The method as recited in claim 1, wherein the set of alignable wakeup events comprise one or more Wake on Wan events.

6. The method as recited in claim 1, wherein the set of alignable wakeup events comprise a Wake on Wan event, and wherein further the controlling comprises:
   buffering a message sent from a server to the mobile device, wherein the message triggers the Wake on Wan event;
   setting a trigger time of an RTC of a processor of the mobile device based on the alignment processing moment; and
   commencing to process the message after the processor is triggered.

7. The method as recited in claim 1, further comprising:
   identifying an unalignable wakeup event; and
   commencing processing of the unalignable wakeup event upon occurrence thereof regardless of the alignment processing moment.

8. The method as recited in claim 1, wherein the determining the alignment processing moment comprises:
   determining a time interval between temporally adjacent alignment processing moments;
   commencing a timing of a duration of a determined time interval upon the mobile device entering a standby mode; and
   determining the alignment processing moment based the determined time interval.

9. The method as recited in claim 1, wherein the set of alignable wakeup events comprises at least one alarm wakeup event.

10. The method as recited in claim 1, wherein the set of alignable wakeup events comprises a plurality of Wake on Wan events, and further comprising:
determining an occurrence frequency of the plurality of Wake on Wan events, wherein the controlling the set of alignable wakeup events is performed responsive to a determination that the occurrence frequency exceeds a preset value.

11. The method as recited in claim 1, further comprising determining a plurality of alignment processing moments for the set of alignable wakeup events, wherein the set of alignable wakeup events comprise alarm wakeup events and Wake on Wan events, wherein a sequential pair of alignment processing moments of the alarm wakeup events are separated by a first time interval and wherein a sequential pair of alignment processing moments of the Wake on Wan events are separated by a second time interval.

12. The method as recited in claim 11, wherein the alignment processing moments of the alarm wakeup events and alignment processing moments of the Wake on Wan events coincide.

13. The method as recited in claim 12, wherein the alignment processing moments of the alarm wakeup events comprise the alignment processing moments of the Wake on Wan events.

14. The method as recited in claim 13, further comprising:
determining an occurrence frequency of the Wake on Wan events, wherein the alignment processing moments of the Wake on Wan events comprise the alignment processing moments of the alarm wakeup events if the Wake on Wan events occurrence frequency is below a preset value.

15. The method as recited in claim 1, wherein the determining the alignment processing moment comprises:
counting a number of the set of alignable wakeup events after the mobile device enters a standby mode; and
determining the alignment processing moment based on the number of the alignable wakeup events.

16. A non-transitory computer readable storage medium comprising instructions that, when executed by a processor of a mobile device, cause the processor to perform a method of saving power in the mobile device, the method comprising:
determining an alignment processing moment for a set of alignable wakeup events; and
controlling processing of the set of alignable wakeup events to commence at the alignment processing moment, wherein the set of alignable wakeup events occur in different times and prior to the alignment processing moment.

17. The non-transitory computer readable storage medium as recited in claim 16, wherein the set of alignable wakeup events occur during an alignment processing time period that is defined between the mobile device entering into a standby mode and the alignment processing moment.

18. The non-transitory computer readable storage medium as recited in claim 16, wherein the set of alignable wakeup events occur during an alignment processing period that is defined between a preceding alignment processing moment and the alignment processing moment.

19. The non-transitory computer readable storage medium as recited in claim 16, wherein the controlling comprises controlling a trigger time of a real time clock (RTC) of a central processing unit (CPU) of the mobile device.

20. The non-transitory computer readable storage medium as recited in claim 16, wherein further the controlling comprises:
buffering a message sent from a server to the mobile device, wherein the message triggers an alignable wakeup event of the set of alignable wakeup events;
setting a trigger time of an RTC of a processor of the mobile device based on the alignment processing moment; and
commencing processing of the message after the processor is triggered.

* * * * *